Dec. 12, 1939.     C. H. SCHURR     2,183,369
CHUCK
Filed Aug. 20, 1935     2 Sheets-Sheet 1

INVENTOR.
Charles H. Schurr
BY Hawgood and Van Horn
ATTORNEY.

Dec. 12, 1939.　　C. H. SCHURR　　2,183,369
CHUCK
Filed Aug. 20, 1935　　2 Sheets-Sheet 2

INVENTOR.
Charles H. Schurr
BY Hawgood and Van Horn
ATTORNEYS

Patented Dec. 12, 1939

2,183,369

UNITED STATES PATENT OFFICE 2,183,369

CHUCK

Charles H. Schurr, Cleveland, Ohio, assignor to The Lees-Bradner Company, Cleveland, Ohio, a corporation of Ohio Application August 20, 1935, Serial No. 37,006

8 Claims. (Cl. 279—113)

This invention relates to chucks and operating means therefor.

An object of the invention is to provide an improved chuck which will effectively hold an article such as a work piece.

Another object is to provide an improved chuck which may be easily operated to grip or release an article.

Another object is to provide an improved chuck which will tightly retain an article until actuated to release the same.

Another object is to provide an improved chuck which may be caused to grip tightly by the use of relatively little power.

Other objects will hereinafter appear.

The invention will be better understood from the description of one practical embodiment thereof, illustrated in the accompanying drawings, in which.

Figure 1:
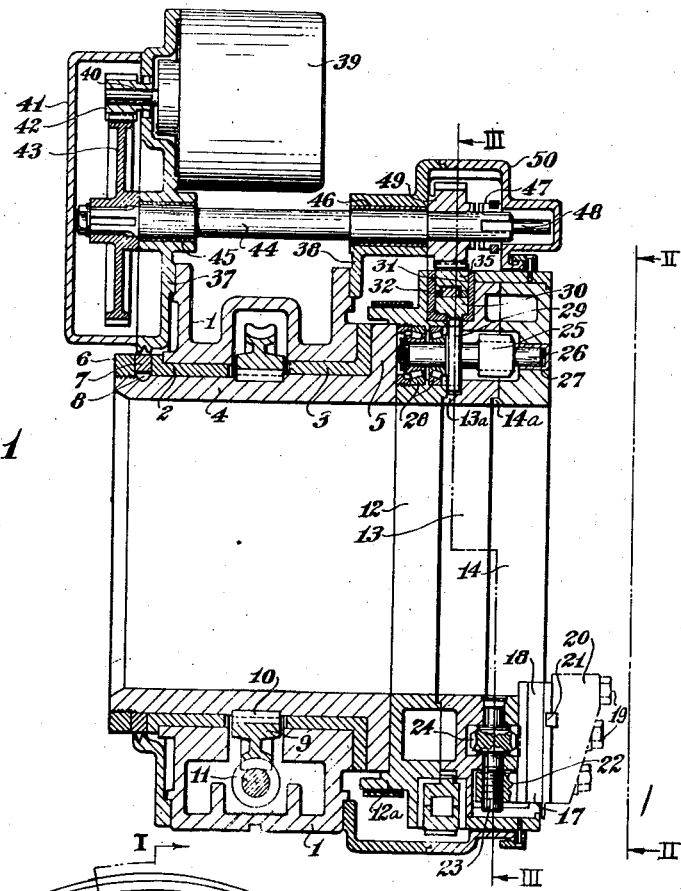
Figure 1 is a sectional view, taken on the line I—I of Figure 2, of a chuck embodying the invention secured to parts of a machine tool, the machine chosen for the purpose of this illustration being a thread miller.
Figure 2:
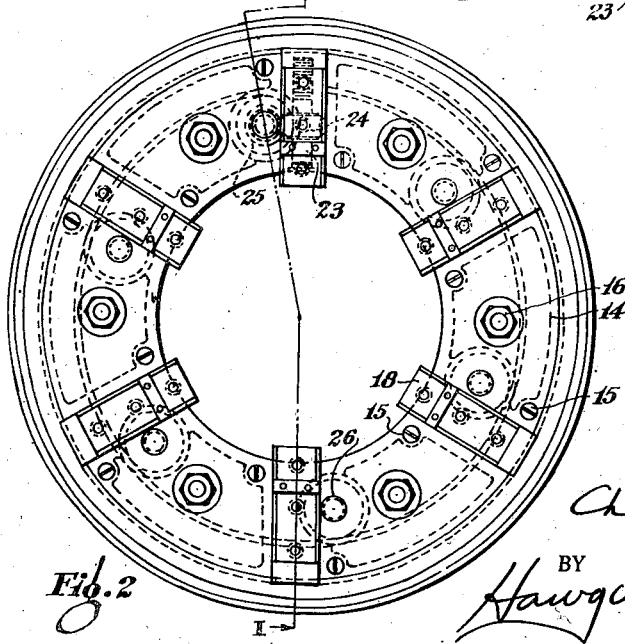
Figure 2 is an end elevation of the parts shown in Figure 1.

The work carrying head of a machine tool is indicated at 1, this comprising a casing carrying bearings 2 and 3 in which is rotatably supported a hollow cylindrical work spindle consisting of a tubular portion 4 and an annular flange 5 bearing upon a smaller annular flange of bearing sleeve 3. The other end of the spindle is provided with a ring 6 threaded thereupon and a washer 7 keyed thereto as by a Woodruff key 8, and bearing upon an annular flange formed upon the other bearing sleeve 2.

Means are shown for rotating the spindle consisting of a worm wheel 9 keyed thereto as indicated at 10 and driven by a worm 11 journalled in the head and operated by any desired source of power such as an electric motor or the driving mechanism of the machine tool.

Secured to the work spindle is a chuck which consists of a frame having an inner annular part 12, an intermediate annular part 13 and an outer annular part 14. These parts are secured together as by machine screws 15 and the entire chuck is secured to the face of the spindle by bolts or machine screws 16.

These chuck frame parts have telescopically engaging recesses and flanges 12a, 13a, and 14a which accurately align them axially with each other and with the spindle.

Formed in the outer annular member 14 of the chuck frame are a plurality of radially disposed guide ways 17 and slidable in each pair of guideways is a jaw member 18 to the exterior of which may be secured, as by machine screws 19, a false jaw or article engaging member 20, being radially positioned by a key 21. Each jaw has an inwardly extending threaded boss 22 received within a hollow or recess formed between the intermediate and outer frame members, and through which passes a threaded shaft 23 journalled in aligned semi-circular recesses formed in the abutting faces of the intermediate and outer frame members.

Each shaft 23 is provided with a worm wheel 24, made integral therewith or rigidly fixed thereto, and each worm wheel is in mesh with the worm 25 rigidly formed with or secured to an axially extending shaft 26 passing through all three frame members and supported by bearings 27 and 28 therein.

Each of shafts 26 has likewise formed or secured on it a pinion gear 29 and all of these pinion gears are in mesh with an internal gear 30 formed on an annular ring supported in two L-shaped bearings 31 and 32 carried by the recessed adjacent faces of frame members 12 and 13.

The exterior of the internal ring gear is provided with a projecting boss or block 33 rigidly secured to it either as by being made integral with it or by being positioned within a notch in the ring gear and held in place by machine screws 34 or the like.

Also retained within the bearings 31 and 32 and slidably mounted on the exterior of the internal ring gear is an external ring gear 35 which is provided on its inner surface with a lug or block 36 similar to part 33 and adapted to engage therewith to permit one ring gear to rotate the other.

Secured upon the head are two brackets 37 and 38, the former of which has secured to it an electric motor 39, the shaft 40 of which passes through a space enclosed by the bracket 37 and a cover 41 secured thereto. On the end of the shaft within this space is provided a pinion 42. This pinion meshes with a gear 43 keyed to a shaft 44 passing through journals 45 and 46 in the brackets 37 and 38, respectively.

The remote end of this shaft has splined to it a clutch 47 provided with an actuator rod 48, and rotatable upon the shaft 44 is a pinion 49 in mesh with the outer ring gear 35. The pinion may be rigidly connected to the shaft by means of the clutch. The above clutch and pinion are enclosed between bracket 38 and a cover 50.

A solenoid 51 is connected to rod 48 to engage the clutch, while a spring 52 disengages it when the solenoid is deenergized.

A second solenoid 53 is connected to a brake band 54 arranged on flange 12a and may be energized to hold the chuck against rotation.

Figure 4:
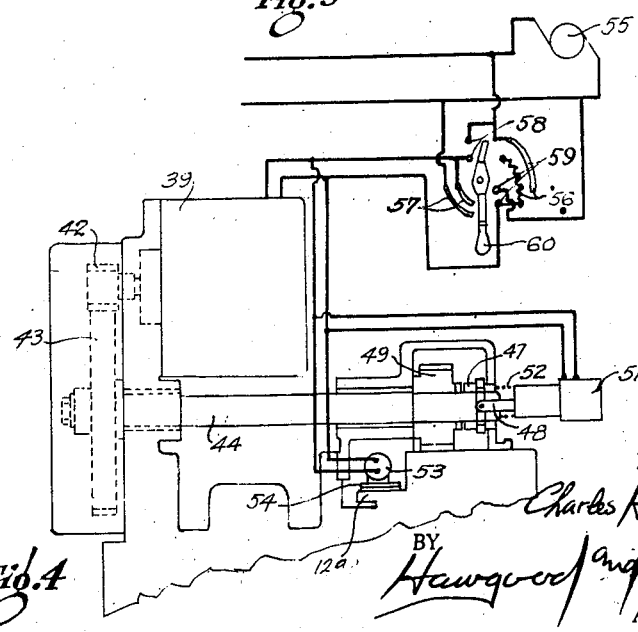
Figure 4 is a fragmentary sectional view similar to Figure 1 and diagrammatically indicating electrical operating circuits.

In Figure 4 the circuits operating the parts are diagrammatically illustrated, and from this figure it will be apparent that the motor may be supplied current from a generator 55 through a tapped rheostat 56 and contact 57 or the like to operate motor 39 in one direction, and may be supplied at full line current to operate the motor in the other direction through contacts 58 and 59.

These elements above mentioned are controlled by movable contacts on an insulated lever 60.

The tapped rheostat is used to supply varying current in closing the jaws, so that the operator can apply any speed or pressure desired upon the article to be held, while in opening the jaws there is no need for varying the current and a single switch is employed.

When either circuit is being energized, the solenoid 51 connected to the clutch causes this to move into engagement, while the spring 52 retracts it out of engagement when the current is discontinued.

The second solenoid 53 causes the brake band 54 to clamp the exterior of the flange 12a of the chuck and hold this in stationary position while the jaws are being opened or closed. These circuits are shown as independent of the circuits for operating the machine tool, as it is generally not desired that the clutch be actuated while the other parts of the tool are in operation.

The operation of the device is as follows:

The false jaws are chosen to permit the chuck, when open, to nearly fit the exterior of the article to be gripped. When an article is placed within the space defined by these jaws, the operator moves lever 60 in a clockwise direction, which permits current to pass through contact 57 and rheostat 56, engaging the clutch 47 and supplying current to drive the motor in the direction to close chuck. Simultaneously, the chuck is clamped by brake 54.

This operation of the motor, through gears 42, 43 and 49 rotates external ring gear 35 until block 36 engages block 33 and, thereafter rotates both ring gear 35 and ring gear 30 in unison. Internal ring gear 30 rotates each of pinions 29, causing the worms 25 to rotate worm wheels 24, and the rotation of threaded shafts 23 moves jaws toward each other until the object is tightly gripped.

The provision of resistance control from the power supplied to the motor permits the application of such pressure as is desired between the jaws and the work piece.

As soon as the gripping has been completed, the current is discontinued and worms 25 and worm wheels 26, being non-reversible, frictionally tightly retain the jaws in their position where they are locked upon the article within the chuck. This action is further aided by the non-reversibility of the threads of the jaws and shafts 23.

Figure 3:
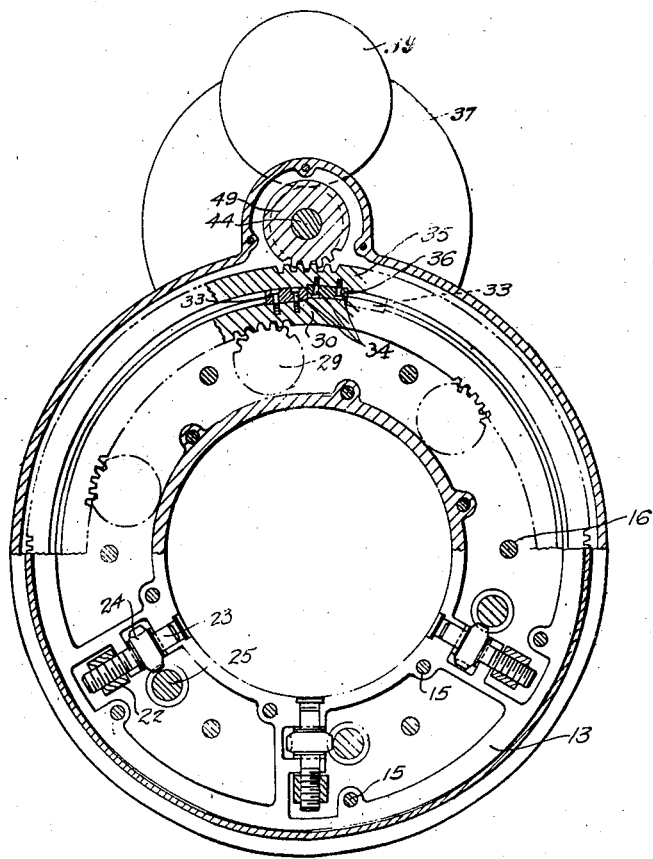
Figure 3 is a transverse sectional view taken on the line III—III of Figure 1.

This condition obtains until it is desired to release the chuck, when the operator applies current to drive the motor in a reverse direction. As the parts are in static condition and under considerable pressure, the greatest amount of power for operating the chuck must be delivered at the start of the opening operation. This is obtained by supplying motor full power, which causes it to drive external ring gear in a reverse direction. This ring gear is free to rotate without load for almost a complete revolution, while block 36 moves from its position shown in solid lines in Figure 3 around until its opposite side strikes the passage of block 33 as shown in dashed lines in this figure, permitting the motor to speed up and the parts to gain considerable momentum.

In this manner, a sufficient blow is delivered at the start of the opening operation to overcome the friction and inertia of the parts and to loosen the jaws upon the article.

Thereafter, both rings move together, the parts operating in opposite directions from that in which they operated in closing, until the article is released.

During the time that the article is being operated upon, clutch 47 may be released so that there is no load driven by the rotating chuck other than that necessary to spin pinion 49 on shaft 44. If, however, the chuck is to rotate at a very low speed, the clutch need not be released, but the chuck will simply slowly rotate shaft 44 and the motor shaft 40, but the release is more advantageous when the chuck rotates at relatively higher speeds.

In a machine in which the chuck need rotate only at low speeds, the clutch may be entirely omitted, and pinion 49 keyed directly to shaft 44.

The clutch may be manually operated, or it may be actuated mechanically, or in any desired or well known manner other than by a solenoid.

While I have described the illustrated embodiment of my invention in some particularity, obviously many other embodiments, variations and modifications thereof will readily occur to those skilled in this art, and I do not therefore limit myself to the precise details shown and described herein, but claim as my invention all embodiments, variations and modifications coming within the scope of the appended claims.

I claim:

1. A chuck comprising a frame, a plurality of jaws slidably carried thereby, each jaw being provided with a thread, a threaded element associated with each jaw, a worm wheel connected to said element, a worm in mesh with said worm wheel, a gear rigidly connected to said worm, a ring gear meshing with each of said gears, and means for rotating said ring gear in either direction.

2. A chuck comprising a frame, a plurality of jaws slidably carried thereby, each jaw being provided with a thread, a threaded element associated with each jaw, a worm wheel connected to said element, a worm in mesh with said worm wheel, a gear rigidly connected to said worm, a ring gear meshing with each of said gears, means for rotating said ring gear in either direction comprising a rotatable element coaxial with said ring gear, and inter-engaging means carried by said ring gear and element.

3. A chuck comprising a frame, a plurality of jaws slidably carried thereby, each jaw being provided with a thread, a threaded element associated with each jaw, a worm wheel connected to said element, a worm in mesh with said worm wheel, a gear rigidly connected to said worm, a ring gear meshing with each of said gears, means for rotating said ring gear in either direction comprising a rotatable element coaxial with said ring gear, and inter-engaging means carried by said ring gear and element, said element comprising a second ring gear and a motor for rotating said ring gear in either direction.

4. A chuck comprising a frame, a plurality of jaws slidably carried thereby, each jaw being provided with a thread, a threaded element associated with each jaw, a worm wheel connected to said element, a worm in mesh with said worm wheel, a gear rigidly connected to said worm, a ring gear meshing with each of said gears, means for rotating said ring gear in either direction comprising a rotatable element coaxial with said ring gear, inter-engaging means carried by said ring gear and element, said element comprising a second ring gear and a motor for rotating said ring gear in either direction, brake means for restraining the chuck from rotation, and automatic means causing said brake to be actuated while said motor is being operated.

5. A chuck comprising a frame, a plurality of jaws slidably carried thereby, each jaw being provided with a thread, a threaded element associated with each jaw, a worm wheel connected to said element, a worm in mesh with said worm wheel, a gear rigidly connected to said worm, a ring gear meshing with each of said gears, means for rotating said ring gear in either direction comprising a rotatable element coaxial with said ring gear, said rotating means including a motor, inter-engaging means carried by said ring gear and element, and a clutch interposed between said rotatable element and said motor.

6. A chuck comprising a frame, a plurality of jaws slidably carried thereby, each jaw being provided with a thread, a threaded element associated with each jaw, a worm wheel connected to said element, a worm in mesh with said worm wheel, a gear rigidly connected to said worm, a ring gear meshing with each of said gears, means for rotating said ring gear in either direction comprising a rotatable element coaxial with said ring gear, said rotating means including a motor, inter-engaging means carried by said ring gear and element, a clutch interposed between said rotatable element and said motor, and automatic means causing said clutch to engage when the motor is operated and to disengage when the motor is stopped.

7. A chuck comprising a frame, a plurality of jaws slidably carried thereby, each jaw being provided with a thread, a threaded element associated with each jaw, a worm wheel connected to said element, a worm in mesh with said worm wheel, a gear rigidly connected to said worm, a ring gear meshing with each of said gears, means for rotating said ring gear in either direction comprising a rotatable element coaxial with said ring gear, said rotating means also including a motor, inter-engaging means carried by said ring gear and element, brake means for restraining the chuck from rotation, automatic means causing said brake to be actuated while said motor is being operated, a clutch interposed between said rotatable element and said motor, and automatic means causing said clutch to engage when the motor is operated and to disengage when the motor is stopped.

8. A chuck comprising a frame, a plurality of jaws slidably carried thereby, each being provided with a thread, a plurality of threaded elements carried by the frame, one associated with each jaw and engaging the thread thereof, a non-reversible gear train connected to each threaded element, a common operating gear meshing with an element of each non-reversible gear train, and means for driving said common gear.

CHARLES H. SCHURR.